US010777074B1

(12) United States Patent
Tan et al.

(10) Patent No.: US 10,777,074 B1
(45) Date of Patent: Sep. 15, 2020

(54) METHOD AND DEVICE FOR PREEMPTING A TRANSMISSION DURING A GROUP CALL

(71) Applicant: MOTOROLA SOLUTIONS, INC., Chicago, IL (US)

(72) Inventors: Chun Meng Tan, Bayan Lepas (MY); Choon Kang Wong, Ipoh (MY); Woei Chyuan Tan, Bayan Lepas (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/689,270

(22) Filed: Nov. 20, 2019

(51) Int. Cl.
  *H04W 4/08* (2009.01)
  *G08B 25/01* (2006.01)
  *G08B 25/00* (2006.01)
  *H04W 4/90* (2018.01)

(52) U.S. Cl.
  CPC ......... *G08B 25/016* (2013.01); *G08B 25/006* (2013.01); *H04W 4/08* (2013.01); *H04W 4/90* (2018.02)

(58) Field of Classification Search
  CPC . H04W 72/121; H04W 72/1247; H04W 4/08; H04W 4/90; G08B 25/016
  See application file for complete search history.

(56) References Cited

U.S. PATENT DOCUMENTS

| | | | |
|---|---|---|---|
| 7,747,269 B2 | 6/2010 | Brewer et al. | |
| 7,792,277 B2 | 9/2010 | Shaffer et al. | |
| 8,195,215 B2 | 6/2012 | Marocchi et al. | |
| 8,989,207 B2 | 3/2015 | Sajadieh et al. | |
| 9,336,675 B2 | 5/2016 | Miller et al. | |
| 9,510,243 B2 | 11/2016 | Kordianowski et al. | |
| 10,257,740 B2 | 4/2019 | McDonald et al. | |
| 2007/0066333 A1* | 3/2007 | Chen | H04W 72/005 455/518 |

(Continued)

FOREIGN PATENT DOCUMENTS

WO   2013081759 A1   6/2013

OTHER PUBLICATIONS

Bing Qin Lim, et al.: "Dynamically Assigning Priority for Shared Spectrum Communication Systems", U.S. Appl. No. 16/128,871, filed Sep. 12, 2018, all pages.

*Primary Examiner* — Hongmin Fan
(74) *Attorney, Agent, or Firm* — Raguraman Kumaresan

(57) ABSTRACT

A process for preempting a transmission during a group call. An electronic computing device detects a user interaction by a first talk group member with multimedia content corresponding to an incident and determines an interaction measure corresponding to the user interaction with the multimedia content. The electronic computing device then adjusts a transmission preemption priority assigned to the first talk group member based on the interaction measure and an incident priority level associated with the incident. When a user input to initiate a transmission from a first communication device associated with a first talk group member is detected, the electronic computing device preempts a transmission from a second communication device associated with a second talk group member participating in the group call when the adjusted transmission preemption priority assigned to the first talk group member is greater than a transmission preemption priority assigned to the second talk group member.

20 Claims, 7 Drawing Sheets

(56) References Cited

U.S. PATENT DOCUMENTS

2014/0280937 A1    9/2014  Miller et al.
2016/0219628 A1*   7/2016  Sharma ................. H04W 76/45
2018/0160277 A1*   6/2018  Patel ...................... H04W 4/10
2018/0288224 A1*  10/2018  Dizengof ................ H04W 4/90

* cited by examiner

US 10,777,074 B1

METHOD AND DEVICE FOR PREEMPTING A TRANSMISSION DURING A GROUP CALL

BACKGROUND OF THE INVENTION

In communication systems that offer group call functions, a communication device affiliated with a particular group receives group communications sent by other members of the group during a group call. In some communication systems, communication resources are allocated to permit only one member of the group to initiate transmission at any given point in time during the group call. In such systems, other members participating in the group call have to wait for a transmitting member to complete the transmissions before they can be granted communication resources to transmit during the group call session. Some customers expect communication systems offering group call functions to permit another member to interrupt a transmission on a group call in certain situations.

BRIEF DESCRIPTION OF THE SEVERAL VIEWS OF THE DRAWINGS

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
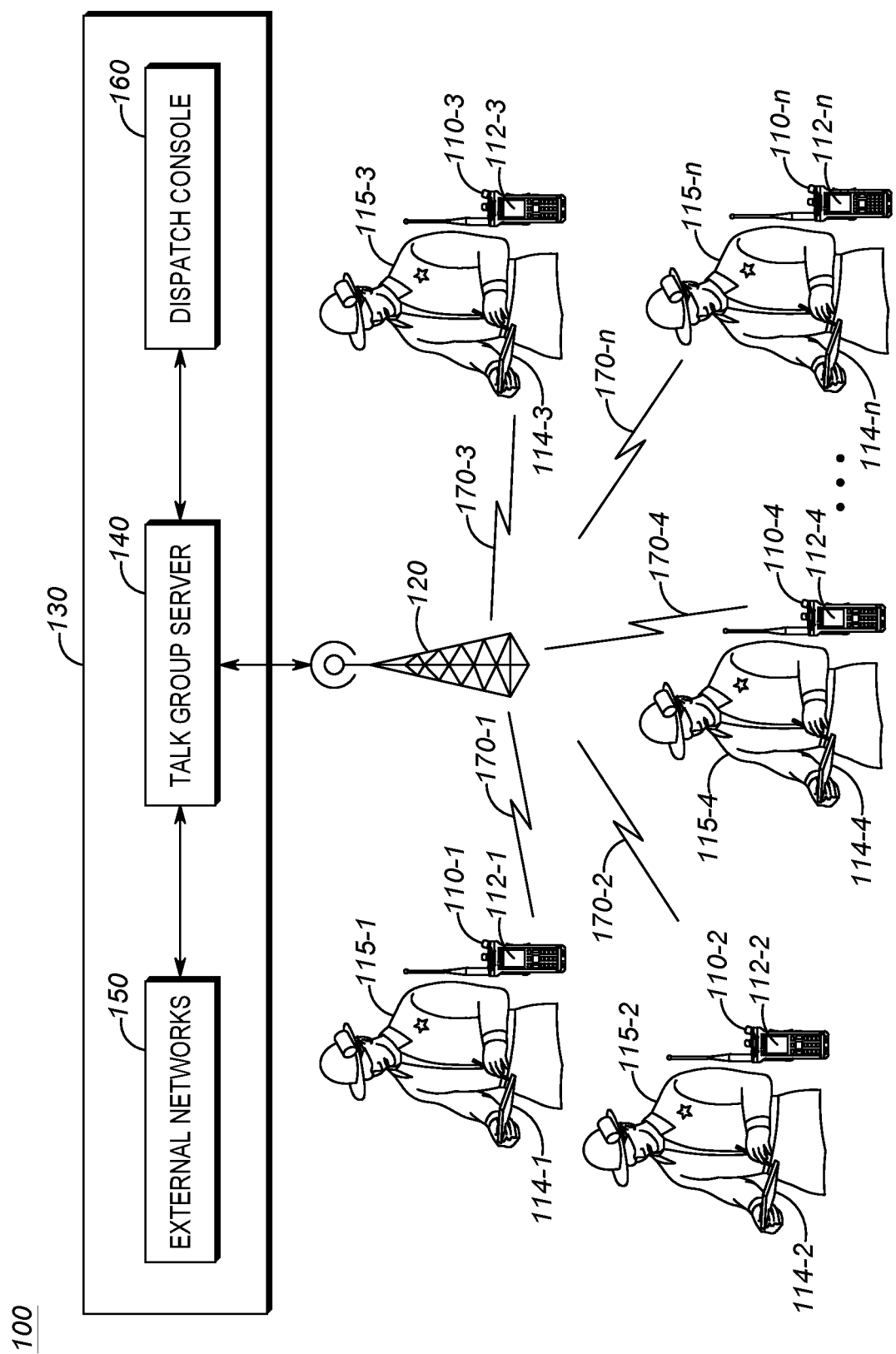
FIG. 1 is a system diagram illustrating a system for preempting a transmission during a group call.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method for preempting a transmission during a group call. The method includes: detecting, at an electronic computing device, a user interaction by a first talk group member with multimedia content corresponding to an incident; determining, at the electronic computing device, an interaction measure corresponding to the user interaction with the multimedia content; determining, at the electronic computing device, an incident priority level associated with the incident; adjusting, at the electronic computing device, a transmission preemption priority assigned to the first talk group member based on the interaction measure and the incident priority level; and detecting, at the electronic computing device, a user input to initiate a transmission from a first communication device associated with the first talk group member during a group call, and responsively preempting a transmission from a second communication device associated with a second talk group member participating in the group call when the adjusted transmission preemption priority assigned to the first talk group member is greater than a transmission preemption priority assigned to the second talk group member.

A further embodiment provides an electronic computing device. The electronic computing device includes a communication interface and an electronic processor communicatively coupled to the transceiver. The electronic processor is configured to: detect a user interaction by a first talk group member with multimedia content corresponding to an incident; determine an interaction measure corresponding to the user interaction with the multimedia content; determine an incident priority level associated with the incident; adjust a transmission preemption priority assigned to the first talk group member based on the interaction measure and the incident priority level; and detect a user input to initiate a transmission from a first communication device associated with the first talk group member during a group call, and responsively preempt a transmission from a second communication device associated with a second talk group member participating in the group call when the adjusted transmission preemption priority assigned to the first talk group member is greater than a transmission preemption priority assigned to the second talk group member.

Each of the above-mentioned embodiments will be discussed in more detail below, starting with example system and device architectures of the system in which the embodiments may be practiced, followed by an illustration of processing steps for achieving the method of preempting a transmission during a group call. Further advantages and features consistent with this disclosure will be set forth in the following detailed description, with reference to the figures.

Referring now to the drawings, and in particular FIG. 1, a communication system 100 is shown including a plurality of communication devices 110-1 through 110-*n*, a base station 120, and an infrastructure radio access network (RAN) 130 including a talk group server 140, external networks 150, and a dispatch console 160. The plurality of communication devices 110-1 through 110-*n* can be interchangeably referred to, collectively, as communication devices 110, and generically as a communication device 110. The communication device 110 may be associated with or subscribed to one or more talk groups to participate in group calls. The communication devices 110-1 through 110-*n* may be operated by respective users 115-1 through 115-*n* (for example, a public safety responder), generically referred to as user(s) 115 or talk group member(s) 115. The users 115 may carry or wear the respective communication devices 110, such as a battery-powered portable radio used for narrowband and/or broadband direct-mode or infrastructure communications, a battery-powered radio speaker microphone (RSM) video capture device, and vehicular radios.

Each communication device 110 may include one or more wireless communication interfaces for communicating with a base station 120 and/or directly with one or more other communication devices 110 in the system 100.

The base station 120 and infrastructure RAN 130 works in tandem to provide infrastructure wireless communication services to communication devices 110 that are within a wireless transmission range of the base station 120. While infrastructure RAN 130 is illustrated in FIG. 1 as including a talk group server 140, external networks 150, and a dispatch console 160, in other embodiments, RAN infrastructures may contain a subset of such components or may contain a superset of such components. For example, infrastructure RAN 130 may include one or more elements such as additional base stations, base station controllers, router, switches, gateways, and the like, arranged, connected, and programmed to provide wireless service to communication devices 110. The communication system 100 could take the form of a public-safety radio network or commercial broadband network.

The talk group server 140 may be, for example, a radio controller, PTT server, zone controller, mobile management entity (MME), base station controller (BSC), mobile switching center, site controller, call controller, or other network device. While the talk group server 140 is illustrated as a separate entity in the system 100, the talk group server 140 may be integrated with other devices (such as a zone controller) in the infrastructure RAN 130 and/or within BS 120. The talk group server 140 may be configured to provide registration, authentication, encryption, routing, and/or other services to communication devices 110 operating within the coverage area of the base station 120, in addition to further features and functions disclosed herein. The talk group server 140 may additionally track or have access to group subscription information. The group subscription information identifies each talk group by a unique talk group identifier. Each talk group is associated with a group of talk group members. Each talk group member is identified by a unique identifier associated with a communication device 110 and/or a user 115 operating the communication device 110. For example, the talk group member may be identified by a device identifier (ID) such as a hardware ID, hardware Media Access Control (MAC) address, Internet Protocol (IP) address, radio ID, International Mobile Subscriber Identity (IMSI), a serial number, user ID, or some other unique identifier that can be used to identify subscribed member communication devices or users.

The communication device 110 and/or user 115 operating the communication device 110 that is a member of a particular talk group may be referred herein as a 'talk group member' or a "member." For example, the user 115 may be interchangeably referred herein as a "talk group member 115" when the talk group server 140 identifies a particular talk group member by the user identifier. While the term "talk group" is used in this description, it will be understood by those of skill in the art that a term such as "communication group" or "group" could be used instead, and that the media data being exchanged during a group call among the members of the group could be any suitable type of data, such as voice data, image data, video data, and the like. Further, the term "talk group" is used in this disclosure to refer to a particular group of communications devices 110 that are participating in a group call.

The multimedia content may include a combination of video, audio, or image data that is captured from an incident scene (e.g., vehicle accident, speeding vehicle, fire explosion, presence of a lone child etc.) and further transmitted to the communication device 110 either via a group call or a private call. For example, the multimedia content may be captured from multimedia content sources such as a surveillance camera deployed near the incident scene or a body worn camera of a first responder located at the incident scene. The dispatch console 160 may be configured to receive the multimedia content from multimedia sources near the incident scene and further retransmit the multimedia content to communication devices 110 and/or accessory device 114.

Each talk group member is respectively associated with a display screen 112 for displaying multimedia content corresponding to an incident. The display screen 112 may be integrated as a part of the communication device 110. In one embodiment, the display screen 112 may be additionally or alternatively implemented at an accessory device 114 associated with the user 115 for displaying the multimedia data. For example, each user 115 is shown in FIG. 1 as carrying an accessory device 114 (e.g., a tablet computing device) in which a display screen similar to the display screen 112 may be implemented. In this embodiment, the multimedia content that is captured corresponding to an incident may be additionally or alternatively transmitted to the accessory device 114. The received multimedia content may be displayed via a display screen of the accessory device 114 instead of, or in addition to displaying the multimedia content on the display screen of the communication device 110. The display screen 112 may be, for example, an LCD screen or an OLED display screen. The display screen 112 in some embodiments may take form of a touch screen and thus also acts as an input device for user interaction with the multimedia content displayed on the display screen 112. When the multimedia content includes audio, a speaker component implemented at the communication device 110 or accessory device 114 provides audio output corresponding to the multimedia content.

In accordance with some embodiments, the user 115 receives a notification corresponding to the received multimedia content. The notification may be provided as an audio or visual alert via the communication device 110 or the accessory device 114. Upon receiving the notification, the user 115 may interact with the received multimedia content using user interfaces that are provided at the communication device 110 or the accessory device 114. For example, the user 115 may interact with the multimedia content provided on the display screen 112 via one or more of a touch sensitive input interface incorporated into the display screen 112 or a hardware button or key implemented at the communication device 110. In accordance with some embodiments, an electronic processor (not shown) implemented at the communication device 110 or accessory device 114 initiates a procedure to adjust a transmission preemption priority assigned to a member communication device 110 or user 115 in response to detecting a user interaction with the multimedia content corresponding to an incident.

Each communication device further includes a push-to-talk (PTT) key or button that when depressed by the user 115 causes the corresponding communication device 110 to send a signal to the talk group server 140 to request allocation of communication resources for enabling the communication device 110 to transmit communications to other members participating in a group call. A soft push-to-talk (PTT) input may also be provided for this purpose, for example, via a touch interface on the display screen 112 of the communication device 110.

In accordance with some embodiments, the talk group server 140 controls allocation of communication resources (i.e., talk group frequency channels) required to establish a group call between the members of the talk group. In accordance with some embodiments, the talk group server 140 is configured to permit only one talk group member (i.e., via a communication device 110 associated with the talk group member) to transmit and/or be heard by other members (i.e., via their respective communication devices 110) during a group call. In these embodiments, when a particular member signals to transmit during a group call, for example, via a push-to-talk (PTT) input, the talk group server 140 checks if any other member is currently transmitting during the group call. If no member is transmitting, the talk group server 140 may transmit a signal to the members of the talk group indicating that a floor is granted (e.g., allocation of a voice channel) to the requesting member. On the other hand, if a member is already transmitting in the talk group, the talk group server 140 compares a transmission preemption priority level assigned to the requesting member with a transmission preemption priority level assigned to the currently transmitting member. If the transmission preemption priority level of the requesting member is greater than the transmission preemption priority level of the currently transmitting member, the talk group server 140 grants the floor to the requesting member to enable a communication device 110 associated with the requesting member to preempt transmission from the currently transmitting member. The preemption causes the transmission from the currently transmitting member to be interrupted in order to permit the requesting member to start transmitting on the group call. Otherwise, if the transmission priority level of the requesting member is not greater than the transmission preemption priority level of the currently transmitting member, the talk group server 140 does not grant a floor to the requesting member unless the transmission preemption priority of the requesting member can be adjusted. In accordance with embodiments, the transmission preemption priority assigned to a particular talk group member is adjusted by an electronic computing device (e.g., implemented at the talk group server) based on (i) the user interaction by the requesting member with the multimedia content that is received corresponding to an incident and (ii) an incident priority level associated with the incident.

External networks 150 may be made accessible to communication devices 110 via infrastructure RAN 130. External networks 150 may include, for example, a public switched telephone network (PSTN), a plain old telephone (POT) system, a wide-area packet-switched network such as the Internet, or another wired or wireless service provider's network, among other possibilities. In one embodiment, the communication devices 110 receive multimedia content from one or more remote systems, for example, surveillance camera systems, via the external network 150.

Dispatch console 160 may be directly coupled to the talk group server 140, as shown, or may be indirectly coupled to the talk group server 140 via one or more internal or externals networks. The dispatch console 160 allows an administrator or dispatcher at a dispatch console to initiate infrastructure-sourced group communications to talk group members, among other features and functions. In accordance with some embodiments, the dispatch console 160 may also be added to one or more talk groups as a member of the talk groups, to transmit and/or listen to communications on the talk groups. In one embodiment, the dispatch console 160 receives a notification of occurrence of an incident and may transmit multimedia content associated with the incident to communication devices 110 associated with users 115, for example, particular users assigned to the public safety responder role.

Infrastructure RAN 130 and base station 120 may implement one or more radio access technologies (RATs) and may communicate with communication devices 110 over respective air-interface links 170-1 through 170-n (collectively referred to as air-interface link or links 170) according to the one or more RATs. Example RATs include a direct-mode, conventional, or infrastructure-mode trunked land-mobile-radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, RATs operate in accordance with standard and/or protocols such as Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoW), an LTE Direct or LTE Device to Device, or a PTT over IP (PoIP) application. While FIG. 1 illustrates an example in which all communication devices 110 use a same RAT, in other embodiments, each communication device or set of communication devices may use different RATs to communicate with one or more same or different infrastructure RAN.

Downlink communications over air-interface links 170 may be addressed to communication devices 110 (e.g., multicast or broadcast using an identifier, such as a Subscriber Group ID (SGID), that is associated with a talk group), and/or to one or more single communication devices (e.g., unicast using an identifier, such as a Subscriber Unit Identifier (SUID), that is uniquely associated with that communication device), among other possibilities that are known to those of skill in the art.

In addition to infrastructure wireless air-interface links 170 communicatively coupling the communication devices 110 to the infrastructure RAN 130 via the base station 120, communication devices may also maintain ad-hoc or direct-mode ("ad-hoc") air-interface links 170 without any intervening infrastructure between them. For example, the communication device 110-1 may be wirelessly coupled to communication device 110-2 via a direct-mode air interface link (not shown) in accordance with one or more direct-mode air-interface protocols, such as Bluetooth, near field communication (NFC), Infrared Data Association (IrDA), ZigBee, direct-mode land-mobile-radio (LMR), and/or Wi-Fi, as long as the devices are within mutual transmission range of one another. In accordance with some embodiments, a communication device 110 may forward the multimedia content received from another multimedia source (e.g., dispatch console 160) to another communication device 110 via the air-interface link 170.

Figure 2:
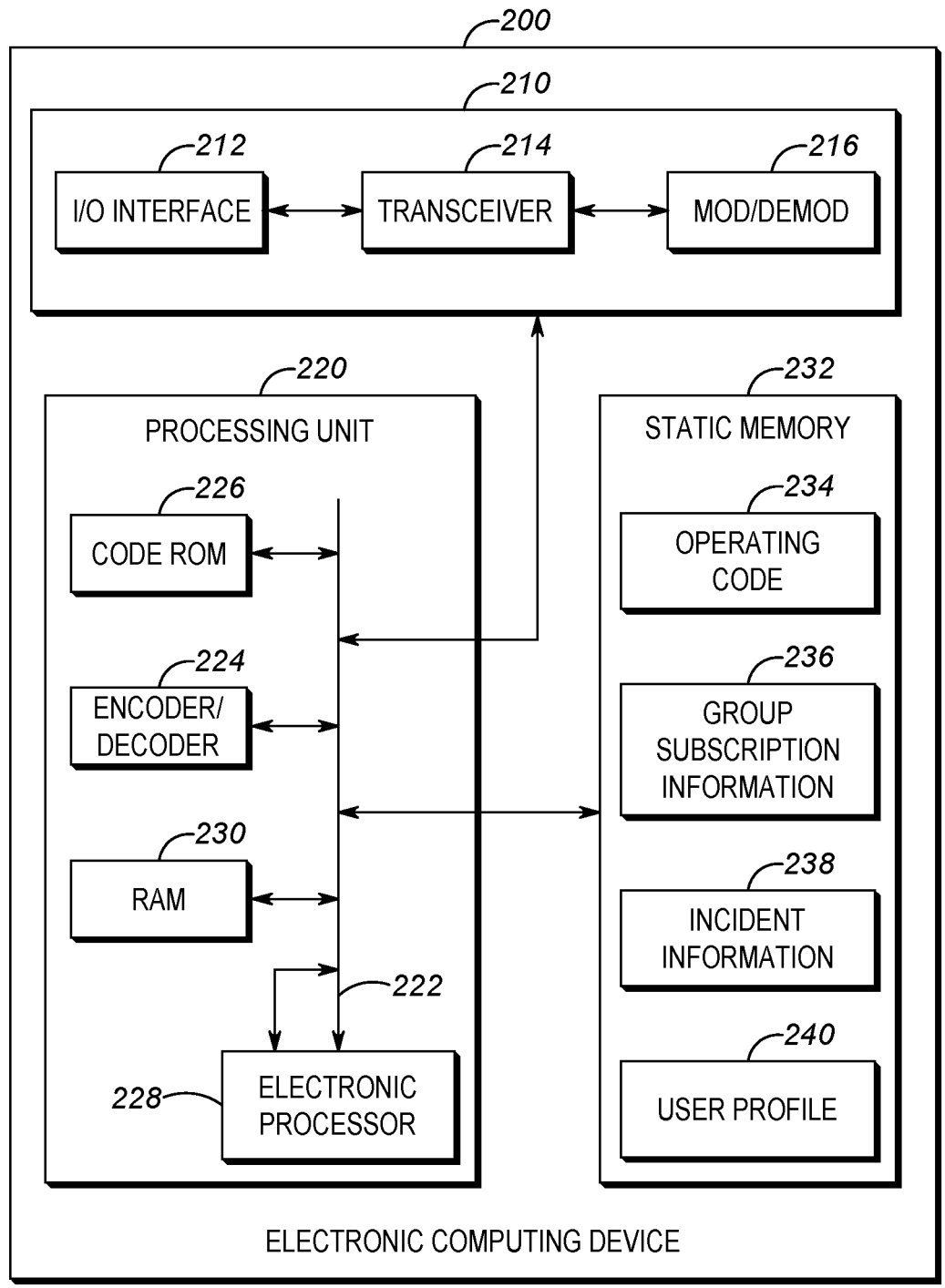
FIG. 2 is a device diagram showing a device structure of an electronic computing device employed in the system of FIG. 1 in accordance with some embodiments.

Now referring to FIG. 2, a schematic diagram illustrates an electronic computing device 200 according to some embodiments of the present disclosure. The electronic computing device 200 may be embodied in the talk group server 140, or dispatch console 160, or another computing device in the infrastructure RAN 130 shown in FIG. 1. Some functions (e.g., detection of user interaction with received multimedia content) of the electronic computing device 200 may be implemented in the communication devices 110 or accessory device 114. In one embodiment, the electronic computing device 200 may be implemented as a distributed computing device across two or more of the foregoing (or multiple of a same type of one of the foregoing) and linked via a wired and/or wireless communication link(s). While FIG. 2 may represent the devices as described above with respect to FIG. 1, depending on the type of the device, the electronic computing device 200 or other devices may include fewer or additional components in configurations different from that illustrated in FIG. 2.

As shown in FIG. 2, the electronic computing device 200 includes a communications unit 210 that is coupled to a common data and address bus 222 of the processing unit 220. The communications unit 210 may include one or more wired or wireless input/output (I/O) interfaces 212 that are configurable to communicate with communication devices 110, base station 120, and/or with other devices in or communicably coupled to the system 100. The communications unit 210 may include one or more wireless transceivers 214, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), a WiMAX transceiver perhaps operating in accordance with an IEEE 802.16 standard, an LTE transceiver, and/or other similar type of wireless transceiver configurable to communicate via a wireless radio network. The communications unit 210 may additionally include one or more wireline transceivers 214, such as an Ethernet transceiver, a Universal Serial Bus (USB) transceiver, or similar transceiver configurable to communicate via a twisted pair wire, a coaxial cable, a fiber-optic link or a similar physical connection to a wireline network. The transceiver 214 is also coupled to a combined modulator/demodulator 216 that is coupled to an encoder/decoder 224 of the processing unit 220.

The processing unit 220 may include the encoder/decoder 224 with an associated code Read Only Memory (ROM) 226 for storing data for initializing system components, and encoding and/or decoding voice, data, control, or other signals that may be transmitted or received between the talk group server 140 and communication devices 110 in the system 100. The processing unit 220 includes an electronic processor 228 coupled, by the common data and address bus 222, to the encoder/decoder 224, a Random Access Memory (RAM) 230, and a static memory 232.

Static memory 232 may comprise, for example, a hard-disk drive (HDD), an optical disk drive such as a compact disk (CD) drive or digital versatile disk (DVD) drive, a solid state drive (SSD), a tape drive, a flash memory drive, or a tape drive, to name a few. Static memory 232 stores operating code 234 for the electronic processor 228 that, when executed, performs one or more of the functions set forth in FIG. 3 and accompanying text.

Static memory 232 may store (or electronic computing device 200 has access to, via communications unit 210) permanently or temporarily, group subscription information 236 that, for each group identifier (i.e., a unique identifier assigned to each talk group) associated with a particular group of talk group members, identifies communication devices 110 and/or users 115 that are members of the particular group. The group subscription information 236 further includes, for each talk group member, transmission preemption priority assigned to the talk group member. In one embodiment, the transmission preemption priority may be assigned as a numerical value, for example, in the range of "zero" to "ten," with "zero" being the lowest preemption priority (or a default priority in case priority is yet to be assigned or adjusted) and "ten" being the highest preemption priority. In accordance with embodiments, a talk group member having a higher transmission preemption priority can interrupt transmission of another talk group member having a lower transmission preemption priority in order to transmit its own transmission during the group call associated with a particular talk group. In another embodiment, the transmission preemption priority may also be assigned in terms of ranking. For example, a talk group member with an assigned ranking of "one" has a higher priority over a talk group member with an assigned ranking of "three" or "five." In accordance with some embodiments, the electronic processor 228 of the electronic computing device 200 adjusts the transmission preemption priority assigned to a particular talk group member based on an interaction measure corresponding to a user interaction performed by the particular talk group member with a multimedia content received by the talk group member (e.g., at the communication device 110 and/or the accessory device 114) corresponding to an incident and also further based on an incident priority level associated with the incident for which the multimedia content was received by the talk group member.

Static memory 232 may store (or electronic computing device 200 has access to, via communications unit 210) incident information 238 corresponding to one or more incidents assigned to talk group members identified in the group subscription information 236. The incident information 238 includes one or more of: incident identifier, incident severity, incident type, incident location, time elapsed since the incident has been reported, and number of mobilized assets (e.g., first responders) assigned to respond to an incident. In accordance with some embodiments, the electronic computing device 200 determines an incident priority level associated with the incident (i.e., an incident associated with the multimedia content for which the user interaction is detected at block 310) based on incident information 238 associated with the incident.

Additionally, static memory 232 may store (or electronic computing device 200 has access to, via communications unit 210) user profile 240 for each talk group member identified in the group subscription information 236. The user profile 240 for each talk group member includes information related to one or more of: device identifier of the communication device 110 corresponding to the talk group member, user identifier of the user 115 of the communication device 110, talk group identifier with which the talk group member is currently associated, an agency (e.g., fire department, police department, medical department etc.) to which the talk group member is affiliated, rank, experience, and role of the talk group member, a current location of the user 115 and/or communication device 110, historical talk group conversations (i.e., recorded conversations) associated with the talk group member, knowledge data (e.g., skill level and knowledge level of the user) of the user, current presence status, and sensor data (e.g., such as an indication of a gun being removed from holster, heart rate, ambient audio data, environmental data etc.) corresponding to the talk group member. In accordance with some embodiments, when the transmission preemption priorities of two talk group members within the same talk group remain same after adjustments were performed for the transmission preemption priority based on user interactions by the respective talk group members with the multimedia content, the electronic computing device 200 further readjusts the transmission preemption priorities of the respective talk group members based on their respective user profiles 240. For example, the electronic computing device 200 may provide a higher transmission preemption priority to a talk group member assigned to a fire department in case the multimedia content is associated with a fire incident. As another example, the electronic computing device may provide a higher transmission preemption priority to a talk group member when a travel distance between a current location of the talk group member and a location of the incident scene is shorter than a travel distance between a current location of the other member (with the same transmission preemption priority) and the location of the incident scene.

In examples set forth herein, the electronic computing device 200 is not a generic computing device, but a device specifically configured to implement functionality of protecting confidentiality of audio messages. For example, in some embodiments, the electronic computing device 200 specifically comprises a computer executable engine configured to implement functionality of protecting confidentiality of audio messages.

Figure 3:
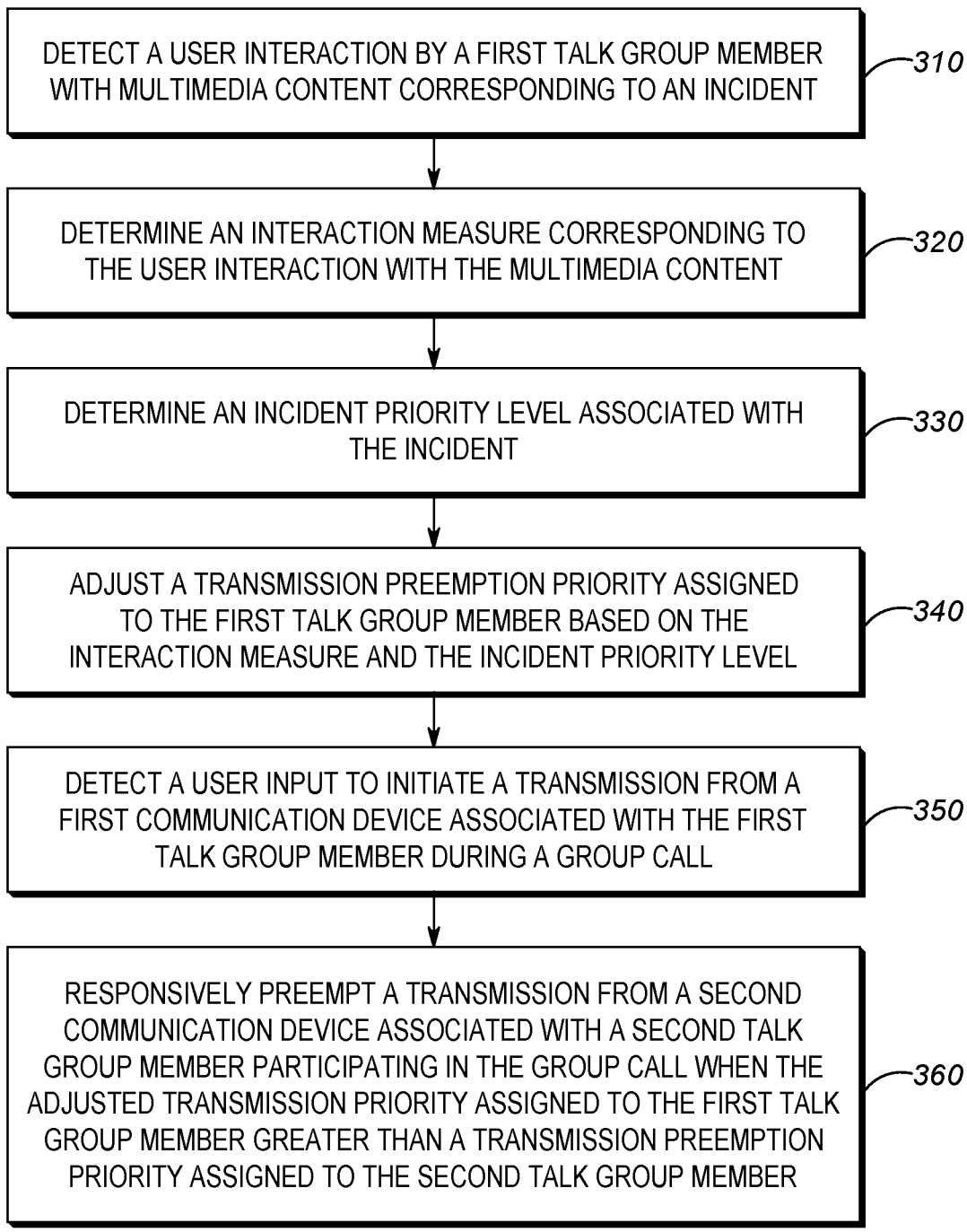
FIG. 3 illustrates a flow chart setting forth process blocks for preempting a transmission during a group call, in accordance with some embodiments.

Turning now to FIG. 3, a flowchart diagram in FIG. 3 illustrates a process 300 for preempting a transmission during a group call. While a particular order of processing steps, message receptions, and/or message transmissions is indicated in FIG. 3 as an example, timing and ordering of such steps, receptions, and transmissions may vary where appropriate without negating the purpose and advantages of the examples set forth in detail throughout the remainder of this disclosure. A corresponding electronic computing device, such as the electronic computing device 200 of FIG. 2, and embodied as a singular electronic computing device or distributed electronic computing device making up an electronic processing system as set forth earlier, may execute process 300. The electronic computing device may execute the process 300 at power-on, at some predetermined periodic time period thereafter, in response to a trigger raised locally at the device via an internal process (e.g., in response to detecting that a multimedia content corresponding to an incident is received at the communication device 110 and/or the accessory device 114 of a user 115), or via an input interface (e.g., the user 115 enabling a particular feature associated with the process 300), among other possibilities.

The process 300 of FIG. 3 need not be performed in the exact sequence as shown and likewise various blocks may be performed in different order or alternatively in parallel rather than in sequence. Accordingly, the elements are referred to herein as "blocks" rather than "steps." The process 300 may be implemented on variations of the system 100 of FIG. 1 as well.

Process begins at block 310 where the electronic computing device detects a user interaction by a first talk group member with multimedia content corresponding to an incident. The multimedia content may correspond to a video, audio, or image data received at the communication device 110 (e.g., first communication device 110-1) and/or accessory device 114 associated with the first talk group member (e.g., user 115). In accordance with some embodiments, the first talk group member receives a notification corresponding to a multimedia content at the communication device 110 and/or accessory device 114. The notification may be provided as an audio or visual alert via the communication device 110 and/or accessory device 114. Upon receiving the notification, the first talk group member may interact with the received multimedia content using user interfaces that are provided at the communication device 110 and/or accessory device 114. For example, the talk group member may interact with the multimedia content displayed on the display screen 112 of the communication device 110 and/or the accessory device 114 via one or more of a touch sensitive input interface incorporated into the display screen or a hardware button or key implemented at the communication device and/or accessory device or gesture/gaze input interface incorporated into the communication device and/or accessory device 114.

In one embodiment, the electronic computing device may obtain multimedia content corresponding to an incident from multimedia content sources such as surveillance cameras, internet-of-things (TOT) devices, and talk group conversations between talk group members. The electronic computing device then transmits multimedia content corresponding to an incident to a communication device and/or accessory device associated with a talk group member and further requests the communication device 110 and/or accessory device 114 associated with the talk group member to send information related to user interaction performed by the first talk group member in relation to the multimedia content. In response to this request, the communication device 110 and/or accessory device 114 provides the electronic computing device with information related to user interaction with the multimedia content when the talk group member performs one or more user interaction functions with respect to the multimedia content. The information related to the user interaction may include a type of user interaction and duration of user interaction with the multimedia content. When the electronic computing device does not receive an indication of user interaction by the first talk group member with the multimedia content from the communication device 110 and/or accessory device 114 within a predetermined time period from transmitting the multimedia content to the communication device 110 and/or accessory device 114 or alternatively when the electronic computing device receives a communication indicating that the talk group member has not interacted with (or ignored) the multimedia content within the predetermined time period, the electronic computing device refrains from adjusting the transmission preemption priority assigned to the talk group member.

When the electronic computing device detects a user interaction with the multimedia content, for example, based on user interaction information received from the communication device 110 and/or accessory device 114, the electronic computing device proceeds to block 320 to determine an interaction measure corresponding to the user interaction with the multimedia content. In one embodiment, the electronic computing device determines the interaction measure based on user interaction information received from the communication device 110 and/or accessory device 114 at which the multimedia content was rendered. For example, the interaction measure may be determined as a function of a type of user interaction and a duration of user interaction with the multimedia content. The electronic computing device may identify a type of user interaction and a duration of user interaction with the multimedia content based on information related to the user interaction received from the communication device 110 and/or accessory device 114. For example, the type of user interaction may include one or more of: viewing or listening (e.g., playback) the multimedia content by the talk group member, for example, by opening a corresponding multimedia application on the communication device 110 and/or the accessory device 114; emphasizing or paying attention (e.g., through eye gaze detection) to certain specific multimedia content, for example, by zooming into a certain portion of the object on the multimedia content (e.g. enlarging into a facial feature of a person in the image) or by repeating or replaying or tuning up volume of a certain duration/segment of the multimedia (e.g. rewind or replay or tune up volume of a certain duration of the voice or video clip playing such as rewind or replay or tune up to listen to the car plate number being read out);

forwarding the multimedia content to another communication device 110 (e.g., a communication device associated with another talk group associated with the same or different talk group); annotating the multimedia content by the talk group member, for example, by highlighting or adding notes or drawings on the multimedia content; and initiating a search query (e.g., by activating a virtual assistant implemented at the communication device 110 or an accessory device 114 with a predefined wake-up word) corresponding to a feature (e.g., person or object of interest identified from the multimedia content) of the multimedia content by the talk group member. As an example, the talk group member may interact with the multimedia content by highlighting a particular object, such as a speeding vehicle identified from the multimedia content and further by activating a virtual assistant with a wake-up word to provide a voice query requesting background information on the owner of the speeding vehicle identified from the multimedia content. In this example, the communication device 110 and/or the accessory device 114, on which the user 115 has interacted with the multimedia content, may send information related to the interactions (e.g., viewing, highlighting, and submitting a query) that the user has performed in relation to the multimedia content. In response, the electronic computing device computes an interaction measure based on the type of user interactions and duration of the user interaction.

In one embodiment, the interaction measure may be expressed as a numerical value between one to ten, wherein "one" indicates a low interaction level, "five" indicates a medium interaction level, and "ten" indicates a high interaction level. As an example, the electronic computing device may determine that the user interaction measure is "one" when the talk group member has viewed or played the multimedia content for a duration of time (e.g., 2 seconds) that is less than a predefined duration (e.g., a total duration of the multimedia content or another threshold duration) and when the talk group member has not performed any additional user interaction (e.g., forwarding the multimedia content or initiating a search query or annotating the multimedia content) with the multimedia content. As another example, the electronic computing device may determine that the user interaction is "ten" when the user has viewed or played the multimedia content for a duration of time that is equal to or greater than the predefined duration and further when the user has performed some additional user interaction with the multimedia content, for example, by emphasizing and paying attention to certain details within the multimedia content, annotating the multimedia content, forwarding the multimedia content, or initiating a search query with respect to particular person or object of interest identified from the multimedia content. In one embodiment, the electronic computing device may also define an interaction measure threshold that determines whether the talk group member is interested in the multimedia content. In this case, any interaction measure value that is not greater than the interaction measure threshold indicates that the talk group member has ignored or is not interested in the multimedia content. Any interaction measure that is greater than the interaction measure threshold may indicate that the talk group member is interested in the multimedia content. As an example, an interest in the multimedia content indicates that the talk group member will further proceed to execute an incident task with respect to the incident for which the multimedia content is received by the talk group member, and further may likely communicate with other members in the talk group regarding the received multimedia content and/or the incident task to be performed in relation to the received multimedia content. In other words, the electronic computing device predicts the likelihood of the talk group member communicating with other members in the talk group based on the type and duration of user interaction that the talk group member has performed on the multimedia content, and further proactively adjusts transmission preemption priority assigned to the talk group member as further described below based on the interaction measure and an incident priority level associated with the incident.

At block 330, the electronic computing device determines an incident priority level associated with the incident. In accordance with embodiments, the electronic computing device determines an incident priority level associated with the incident (i.e., an incident associated with the multimedia content for which the user interaction is detected at block 310) based on incident information associated with the incident. The incident information corresponding to the multimedia content may be extracted, for example, from incident information 238 stored at the static memory 232. The incident priority level may be determined based on specific incident information such as incident severity, incident type, incident location, time elapsed since the incident has been reported, and number of mobilized assets (e.g., first responders) assigned to respond to the incident. As an example, the electronic computing device may assign a higher incident priority level to an incident involving a missing child than an incident involving an investigation for a road rage incident. In other words, an incident with higher severity may be assigned a higher incident priority level than an incident with lower severity. In accordance with some embodiments, the electronic computing device may extract incident information corresponding to an incident from sources such as surveillance cameras, internet-of-things (IOT) devices, sensors, and talk group conversations between first responders. The electronic computing device may also determine a priority level of the incident based on persons or object of interest that are automatically extracted from the multimedia content. As an example, the electronic computing device may determine that a facial feature extracted from the multimedia content matches a suspect who is being searched in relation to a previous kidnapping incident, and in response the electronic computing device may assign a higher incident priority level for the current incident associated with the multimedia content.

Next, at block 340, the electronic computing device adjusts a transmission preemption priority assigned to the first talk group member based on the interaction measure and the incident priority level. In accordance with some embodiments, the transmission preemption priority is adjusted in proportion to the interaction measure and the incident priority level. For example, assume that a first talk group member and a second talk group member are associated with the same talk group and further both received multimedia content corresponding to the same incident. In this case, further assume that the electronic computing device has determined an interaction measure corresponding to a user interaction by the first talk group member with the multimedia content as "eight" and an interaction measure corresponding to a user interaction by the second talk group member with the multimedia content as "five." In this case, the incident priority level associated with the incident is same for both talk group members since the multimedia content received by both talk group members corresponds to the same incident. However, because the interaction measure for the first talk group member is greater than the interaction measure for the second communication device, the adjusted transmission preemption priority for the first talk group member is also greater than the adjusted transmission preemption for the second talk group member.

As another example, assume that the first talk group member received multimedia content corresponding to a first incident (e.g., a child abduction incident) with an incident priority level of "eight" and the second talk group member received multimedia content corresponding to a second incident (e.g., a road rage incident) with an incident priority level of "five." In this case, even when the interaction measures for both first and second talk group members are same, the adjusted transmission preemption priority assigned to the first talk group member is greater than the adjusted transmission preemption priority assigned to the second talk group member because the first incident has an incident priority level greater than an incident priority level of the second incident.

As yet another example, assume that the first talk group member and second talk group member has the same interaction measure and both talk group members interacted with the same multimedia content corresponding to the same incident. In this case, it is possible that the transmission preemption priorities adjusted by the electronic computing device for both the talk group members are same based on the same interaction measures and same incident priority levels. However, in accordance with some embodiments, in order to differentiate the transmission preemption priorities of the talk group members within the same talk group, the electronic computing device further readjusts the transmission preemption priority of the first communication device based on a user profile associated with the first communication device and further readjusts the transmission preemption priority of the second communication device based on a user profile associated with the second communication device. For example, in case the multimedia content corresponds to a fire incident, the electronic computing device may assign a higher transmission preemption priority to the first talk group member than the second talk group member when the user profiles indicate that the talk group member is assigned to a role (e.g., a firefighter role) that is more relevant to responding to the fire incident in comparison to the role (e.g., police officer) of the second talk group member. The user profiles of the first and second talk group members may be extracted from user profile 240 database stored at the static memory 232. Other information included in the user profile such as rank, experience, current location, and recent talk group conversations of the members can also be used to readjust the transmission preemption priorities of the members when the adjustment of the transmission preemption priorities of different members within the same talk group based on interaction measure and incident priority level results in the same transmission preemption priority.

In one embodiment, prior to adjusting the transmission preemption priority assigned to the first talk group member, the electronic computing device determines whether the interaction measure is greater than the interaction measure threshold and further whether the incident priority level is greater than a predetermined priority level. In this embodiment, the electronic computing device adjusts the transmission preemption priority only when the interaction measure is greater than the predetermined interaction threshold and when the incident priority is greater than the predefined priority level. Otherwise, if the interaction measure is not greater than the predetermined interaction threshold or when the incident priority is not greater than the predefined priority level, then the electronic computing device refrains from adjusting the transmission preemption priority assigned to the communication device. In this case, the transmission preemption priority remains the same (e.g., a previously assigned transmission priority or a default transmission preemption priority).

In accordance with some embodiments, the electronic computing device further determines a duration of time needed to execute an incident task to be performed by the first talk group member in relation to the incident. In these embodiments, the electronic computing device assigns an expiry timer for the adjusted transmission preemption priority as a function of the duration of time needed to execute an incident task corresponding to the incident. As an example, consider an incident task in which the talk group member is assigned to control the city traffic while traffic facilities are undergoing maintenance. Assume that the electronic computing device has assigned the above incident task to the first talk group member in response to detecting that the first talk group member has interacted with the multimedia content that is received corresponding to a traffic incident associated with the above incident task. In this case, the electronic computing device may assign an expiry timer for an estimated time duration (e.g., 30 minutes) required to execute the above incident task. The electronic computing device may also assign the highest transmission preemption priority to the first talk group member from among other talk group members in the same talk group if the incident priority level associated with the traffic incident is high and when the interaction measure associated with user interaction by the first talk group member is also greater than the interaction threshold. As another example, consider an incident task in which a talk group member is required to perform an electronic circuitry checking to ensure total power cut-off for safety. In this case, the electronic computing may assign an expiry timer based on an estimated time duration (e.g., 15 minutes) required for the talk group member to coordinate with other talk group members to provide alert in relation to the power cut-off In this case, the electronic computing device may assign a highest preemption priority to the talk group member to ensure other technician's safety while the member is performing the incident task.

When the expiry timer expires, the adjusted transmission preemption priority assigned to the talk group member also expires. In this case, when the expiry timer expires, the electronic computing device reverts the adjusted transmission preemption priority to a transmission preemption priority previously assigned (i.e., prior to adjusting the transmission preemption priority) to the first talk group member. In other words, in these embodiments, the adjusted transmission preemption priority is assigned (e.g., an increased transmission preemption priority) to the talk group members to temporarily enable the talk group members to preempt transmissions of other talk group members participating in the same group call.

In accordance with some embodiments, after adjusting the transmission preemption priority assigned to the first talk group member at block 340, the electronic computing device updates the group subscription information 236 stored at the memory 232 corresponding to the talk group of the first talk group member. In particular, the electronic computing device updates the transmission preemption priority assigned to the first talk group member based on the adjustment made to the transmission preemption priority at block 340. In one embodiment, the electronic computing device transmits a message to the first communication device 110-1 associated with the first talk group member. The message includes information related to the adjusted transmission preemption priority assigned to the first talk group member and further optionally the expiry timer assigned to the adjusted transmission preemption priority.

At block 350, the electronic computing detects a user input to initiate a transmission from a communication device 110 (e.g., first communication device 110-1) associated with the first talk group member during a group call. In one embodiment, the user may press the PTT button implemented at the first communication device associated with the first talk group member 115-1 to initiate a request to transmit during a group call. Pressing the PTT button causes the first communication device to send a PTT signal to the electronic computing device (e.g., talk group server 140) to indicate a corresponding user input to initiate a transmission from the first communication device. In accordance with some embodiments, the PTT signal transmitted from the first communication device associated with the talk group member to the electronic communication device includes information related to the adjusted transmission preemption priority assigned to the first talk group member. The PTT signal may further include the expiry timer assigned to the first talk group member.

In response to detecting the user input to initiate a transmission from the first communication device, the electronic computing device determines whether a communication device (e.g., a second communication device 110-2) associated with another talk group member (e.g., a second talk group member 115-2) participating in the same group call (i.e., associated with same talk group as the first talk group member) is currently transmitting during the group call. In case the electronic computing device determines that the second communication device associated with the second talk group member is currently transmitting during the group call. The electronic computing device then extracts the transmission preemption priority from the group subscription information 236 stored at the memory 232 corresponding to the talk group of the first talk group member. In an embodiment in which the PTT signal includes the adjusted transmission preemption priority assigned to the first talk group member, the electronic computing device extracts the adjusted transmission preemption priority assigned to the first talk group member. The electronic computing device then compares the transmission preemption priority (i.e., adjusted transmission preemption priority) assigned to the first talk group member with a transmission preemption priority assigned to the second talk group member.

The electronic computing device preempts the transmission from the second communication device associated with the second talk group member participating in the same group call as the first talk group member when the adjusted transmission preemption priority assigned to the first talk group member is greater than the transmission preemption priority assigned to the second talk group member. In one embodiment, in order to preempt the transmission from the second communication device, the electronic computing device transmits a first message to the second communication device indicating that the floor (e.g., a talk group channel for transmission) granted to the second communication device to transmit during the group call is being released and further transmits a second message to the first communication device indicating that the floor is granted to the first communication device to transmit during the group call. In response to receiving the first message indicating the release of the floor granted to the second communication device, the second communication device refrains from further transmitting (e.g., voice data) during the group call. In response to the receiving the second message indicating that the floor is granted to the first communication device, the first communication device starts transmitting (e.g., voice data) during the group call to other members of the talk group.

On the other hand, when the electronic computing device determines that the adjusted transmission preemption priority assigned the first talk member is not greater than the transmission preemption priority assigned to the second talk group member, the electronic computing device denies the first communication device's request to transmit during the group call. For example, the electronic computing device may send an acknowledgment indicating that floor is not granted to the first communication device. Alternatively, the electronic computing device may add the first talk group member to a queue that is generated for talk group members waiting to transmit during the group call. In this case, the first communication device has to wait until the second communication device stops transmitting on the group call or until the transmission preemption priority assigned to the first talk group member is readjusted to be greater than the transmission preemption priority assigned to the second talk group member and other talk group members included in the queue.

Assume that the electronic computing device receives additional incident information corresponding to an incident for which the multimedia content is received for user interaction by the first talk group member. The electronic computing device may update the incident priority level determined at block 330 based on the additional incident information that is received corresponding the incident. For example, when the incident information indicates that the incident status of the incident has been updated as a high severity incident (e.g., from a speeding vehicle incident to a vehicle collision incident), the electronic computing device may update the corresponding incident priority level. In this case, the electronic computing device may increase the incident priority level due to the change in the severity of the incident. In response to this change in the incident priority level, the electronic computing device returns to block 340 to readjust the transmission preemption priority assigned to first talk group member. The electronic computing device then repeats the functions described in blocks 340 through 360. For example, when the readjusted transmission preemption priority assigned to the first talk group member is greater than the transmission preemption priority assigned to the second talk group member, the electronic computing device permits the first communication device associated with the first talk group member to preempt transmission of the second communication device associated with the second talk group member.

In embodiments in which the electronic computing device assigns an expiry timer to the preemption transmission priority based on the duration of time needed to execute an incident task corresponding to the incident, the electronic computing device, prior to preempting the transmission from the second communication device at block 360, further determines whether the expiry timer assigned to the transmission preemption priority has expired. In these embodiments, the electronic computing device preempts the transmission from the second communication device associated with the second talk group member only when the electronic computing device determines that the expiry timer assigned to the transmission preemption priority has not expired and further when the adjusted transmission preemption priority assigned to the first talk group member is greater than the preemption transmission priority assigned to the second talk group member. On the other hand, when the expiry timer assigned to the adjusted transmission preemption priority has already expired, the electronic computing device compares the transmission preemption priority previously assigned (i.e., prior to adjusting the transmission preemption priority) to the first talk group member with the transmission preemption priority assigned to the second talk group member. In this case, the electronic computing device preempts the transmission from the second communication device associated with the second talk group member when the transmission preemption priority previously assigned to the first talk member is greater than the transmission preemption priority currently assigned to the second talk group member. Otherwise, when the transmission preemption priority previously assigned to the first talk member is not greater than the transmission preemption priority currently assigned to the second talk group member, the electronic computing device denies the first communication device's request to transmit during the group call.

Figure 4:
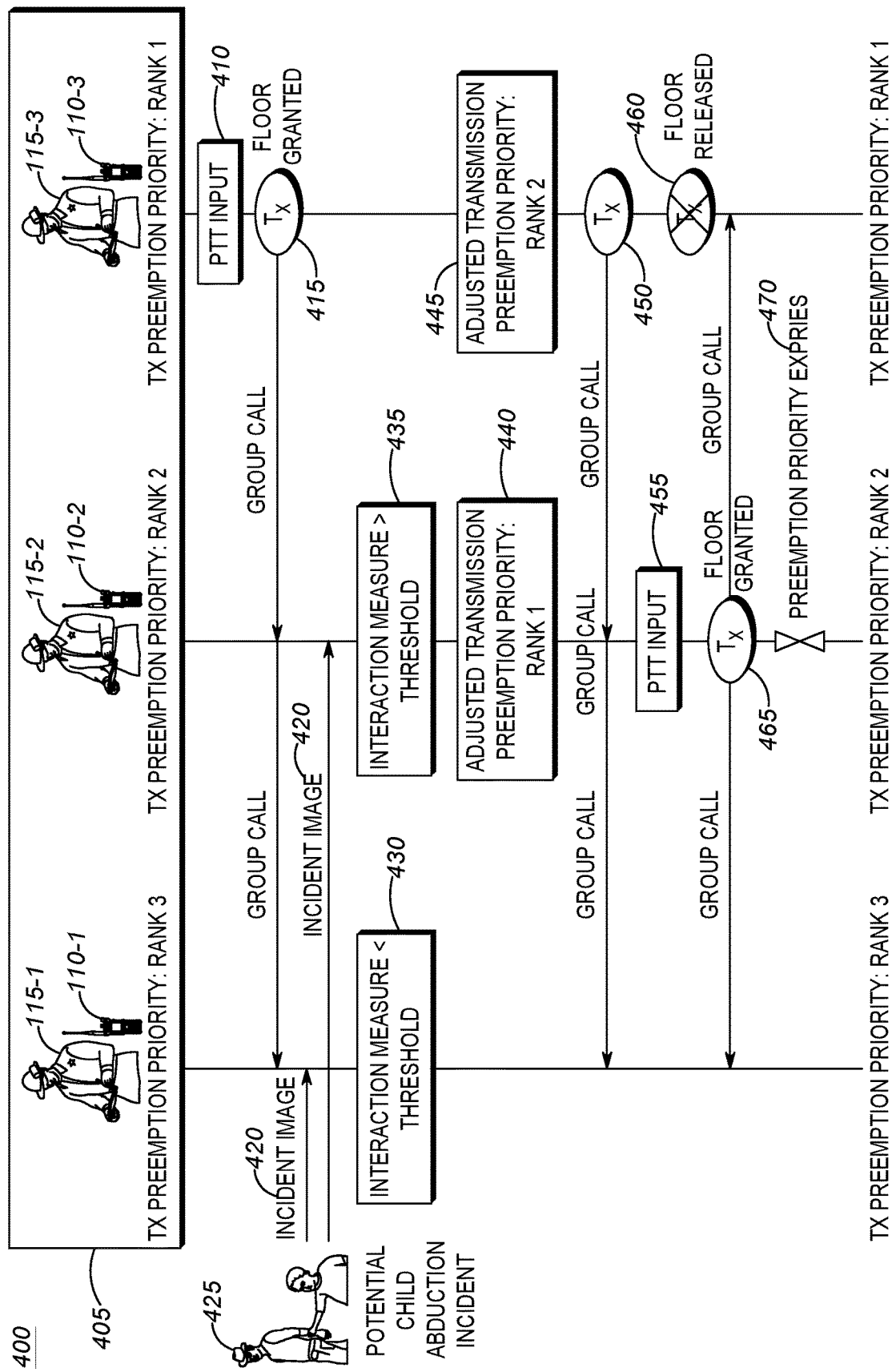
FIG. 4 illustrates a first example scenario in which the embodiments described herein can be advantageously implemented to preempt a transmission during a group call.

FIG. 4 illustrates an example scenario 400 in which the process 300 can be advantageously implemented to preempt a transmission during a group call. In the example scenario 400, a talk group 405 is shown as including three talk group members including a first communication device 110-1 associated with a first talk group member 115-1, a second communication device 110-2 associated with a second talk group member 115-2, and a third communication device 110-3 associated with a third talk group member 115-3. Further, the first talk group member 115-1 is assigned a transmission (Tx) preemption priority ranking of "3," the second talk group member 115-3 is assigned a transmission (Tx) preemption priority ranking of "2," and the third talk group member is assigned a transmission (Tx) preemption priority ranking of "1."

A talk group member 115 may initiate a request to establish a group call with members of the talk group 405 by signaling a PTT input, for example, by pressing or clicking a PTT button implemented at the communication device 110 associated with the talk group member 115. As shown in FIG. 4, the third talk group member 115-3 signals a PTT input 410. Since the third talk group member 115-3 has the highest transmission preemption priority ranking of "1" in the talk group 405 and further no other talk group members are currently transmitting in the talk group, the electronic computing device 200 permits (e.g., by granting a floor) the talk group member 115-3 to establish a group call and further transmit (e.g., voice data) 415 during the group call.

As shown in FIG. 4, the first talk group member 115-1 and second talk group member 115-2 in the talk group 405 respectively receives an incident image 420 (i.e., multimedia content) corresponding to a potential child abduction incident 425. A dispatcher may select first talk group member 115-1 and second talk group member 115-2 as the most relevant members for performing an incident task (e.g., to respond to the location at which the potential child abduction incident was detected) in relation to the potential child abduction incident. For example, the dispatcher may send, via the dispatch console 160, an incident image 420 of an abductor abducting a child as captured by a surveillance camera system near the incident scene to each of the first talk group member 115-1 and second talk group member 115-2, via a separate call.

In the example scenario 400 shown in FIG. 4, the electronic computing device determines that an interaction measure 430 corresponding to a user interaction by the first talk group member 115-1 with the incident image 420 is lower than an interaction threshold. This may be due to first talk group member 115-1 ignoring a notification that was generated at the communication device 110-1 corresponding to receipt of the incident image 420. For example, the first talk group member 115-1 might not have viewed the incident image or alternatively might have viewed the incident image 420 only for a very short duration of time. In this case, the electronic computing device may refrain to adjust the transmission preemption priority ranking of the first talk group member as the interaction measure 430 corresponding to user interaction by the first talk group member 115-1 with the incident image 420 is not greater than the interaction threshold. On the other hand, the electronic computing device determines that an interaction measure 435 corresponding to user interaction by the second talk group member 115-2 with the incident image 420 is greater than the interaction threshold. This may be due to second talk group member 115-2 interacting with the incident image, for example, by viewing the incident image and further initiating a search query (e.g., to obtain information that is not apparent from the incident image 420) related to a feature (e.g., location of the incident, age of the child, prior arrest records of the abductor etc.) regarding the potential child abduction incident 425. In this example, since the interaction measure 435 for the second talk group member 115-2 is greater than the interaction threshold, the electronic computing device adjusts the transmission preemption priority ranking assigned to the second talk group member 115-2 based on the interaction measure 435 and an incident priority level associated with the incident 425. Since the severity of the child abduction incident 425 is very high, the electronic computing device may be programmed to assign a higher incident priority level to the incident 425. Accordingly, in the example shown in FIG. 4, the electronic computing device assigns an adjusted transmission preemption priority ranking 440 of "1" to the second talk group member 115-2 based on the interaction measure 435 and incident priority level associated with the incident 425. The adjustment of the transmission preemption priority ranking assigned to the second talk group member 115-2 also causes the adjustment of transmission preemption priority ranking assigned to the third talk group member 115-3 because the third talk group member 115-3 was assigned to preemption priority ranking of "1." Accordingly, the electronic computing device assigns an adjusted transmission preemption priority ranking 445 of "2" to the third talk group member 115-3.

Further, as shown in FIG. 4, the third talk group member 115-3 continues to transmit to other talk group members 115-1 and 115-2 in the talk group 405. At this point, the second talk group member 115-2 signals a PTT input 455. In one embodiment, the PTT input 455 also includes the adjusted transmission preemption priority ranking 440 assigned to the second talk group member 115-2. Since the third talk group member 115-3 is already transmitting in the talk group 405 via the group call, the electronic computing device, in response to detecting the PTT input 455, compares the adjusted transmission preemption priority ranking 440 of "1" assigned to the second talk group member 115-2 with the adjusted transmission preemption priority ranking 445 of "2" assigned to the third talk group member 115-3. Since the adjusted transmission preemption priority ranking 440 of "1" assigned to the second talk group member 115-2 is greater than the adjusted transmission preemption priority ranking 445 of "2" assigned to the third talk group member 115-3, the electronic computing device allows the second communication device 110-2 associated with the second talk group member 115-2 to preempt the transmission from the third communication device 110-3 associated with the third talk group member 115-3. In one embodiment, as shown in FIG. 4, the electronic computing device releases 460 the floor granted to the third talk group member, thereby causing the third communication device 110-3 to stop transmitting to other talk group members 115-1, 115-3 in the talk group during the group call. Concurrently, the electronic computing device grants a floor 465 to the second communication device 110-2 associated with the second talk group member 115-2 to enable the second communication device 110-2 to transmit (e.g., voice data) to other talk group members 115-1, 115-3 in the talk group 405 during the group call.

The electronic computing device continues to monitor an expiry timer assigned to the adjusted transmission preemption priority ranking 440 assigned to the second talk group member 115-2. The adjusted transmission preemption priority ranking 440 assigned to the second talk group member 115-2 expires 470 upon the expiry of the expiry timer. The expiry 470 of the adjusted transmission preemption priority ranking 440 causes the electronic computing device to revert the respective transmission preemption priority rankings assigned to the second and third talk group members 115-2, 115-3 to the previous transmission preemption priority rankings respectively assigned to the second and third talk group members 115-2, 115-3. As shown in FIG. 4, in this example, the second talk group member is assigned to the transmission preemption priority ranking of "2" and the third talk group member is assigned to the transmission priority ranking of "1" after the adjusted transmission preemption priority ranking 440 assigned to the second talk group member 115-2 expires 470.

Figure 5:
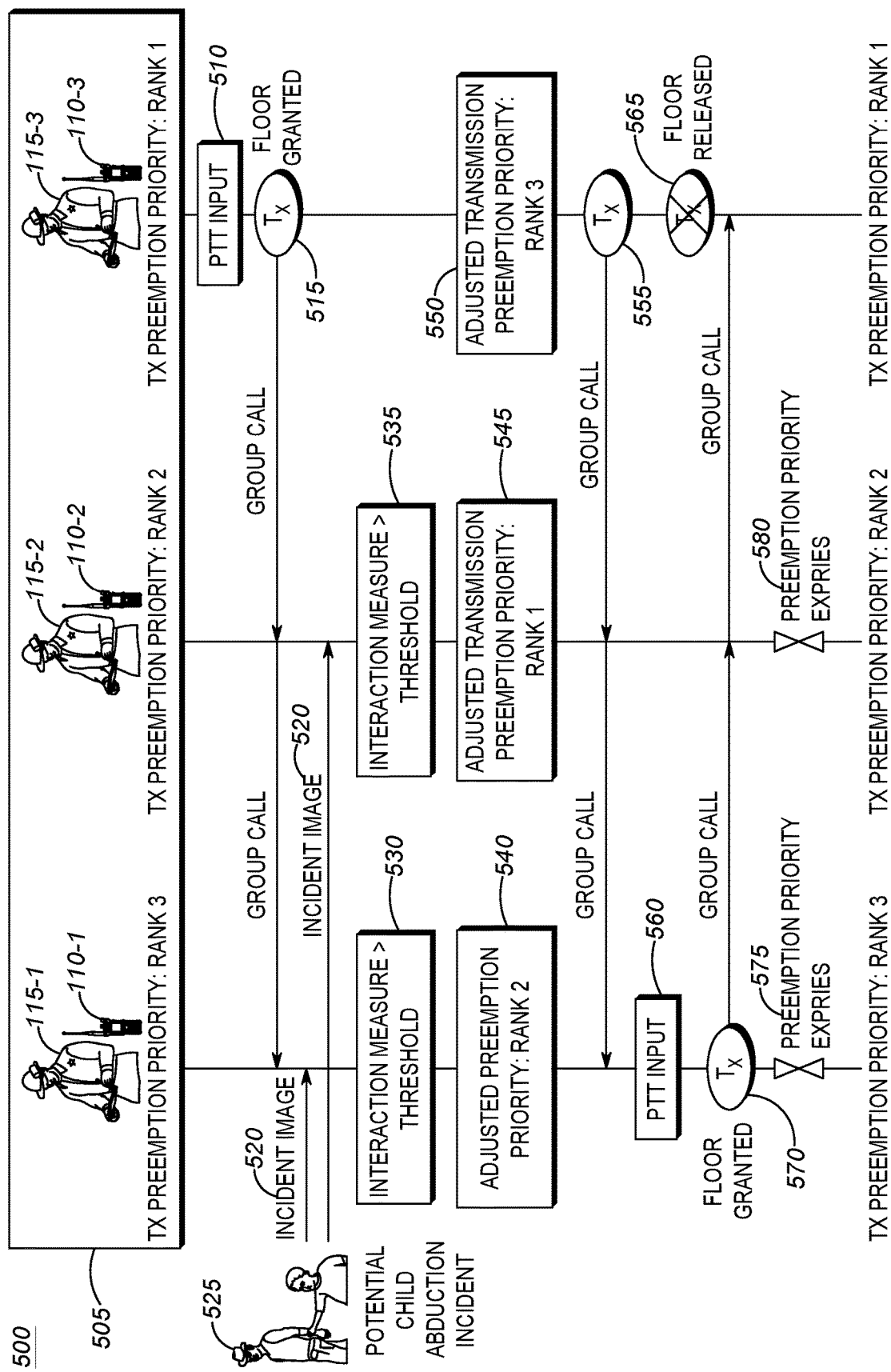
FIG. 5 illustrates a second example scenario in which the embodiments described herein can be advantageously implemented to preempt a transmission during a group call.

FIG. 5 illustrates an example scenario 500 in which the process 300 can be advantageously implemented to preempt a transmission during a group call. In the example scenario 500, a talk group 505 is shown as including three talk group members including a first communication device 110-1 associated with a first talk group member 115-1, a second communication device 110-2 associated with a second talk group member 115-2, and a third communication device 110-3 associated with a third talk group member 115-3. Further, the first talk group member 115-1 is assigned a transmission (Tx) preemption priority ranking of "3," the second talk group member 115-2 is assigned a transmission (Tx) preemption priority ranking of "2," and the third talk group member 115-3 is assigned a transmission (Tx) preemption priority ranking of "1."

A talk group member may initiate a request to establish a group call with members of the talk group 505 by signaling a PTT input, for example, by pressing or clicking a PTT button implemented at the communication device 110 associated with the talk group member 115. As shown in FIG. 5, the third talk group member 115-3 signals a PTT input 510. Since the third talk group member 115-3 has the highest transmission preemption priority ranking of "1" in the talk group 505 and further no other talk group members are currently transmitting on the talk group, the electronic computing device 200 permits (e.g., by granting a floor) the talk group member 115-3 to establish a group call and further transmit (e.g., voice data) 515 during the group call.

As shown in FIG. 5, the first talk group member 115-1 and second talk group member 115-2 in the talk group 405 respectively receives an incident image 520 (i.e., multimedia content) corresponding to a potential child abduction incident 525. A dispatcher may select first talk group member 115-1 and second talk group member 115-2 as the most relevant members for performing an incident task (e.g., to respond to the location at which the potential child abduction incident was detected) in relation to the potential child abduction incident. For example, the dispatcher may separately send, via the dispatch console 160, an incident image 520 of an abductor abducting a child as captured by a surveillance camera system near the incident scene to each of the first talk group member 115-1 and second talk group member 115-2.

In the example scenario 500 shown in FIG. 5, the electronic computing device determines that an interaction measure 530 corresponding to a user interaction by the first talk group member 115-1 with the incident image 520 is greater than an interaction threshold. Concurrently, the electronic computing device determines that an interaction measure 535 corresponding to a user interaction by the second talk group member 115-2 with the incident image 520 is greater than the interaction threshold. This may be due to both first and second talk group members 115-1, 115-2 interacting with the incident image, for example, by viewing the incident image and further initiating a search query related to a feature (e.g., location of the incident, age of the child, prior arrest records of the abductor etc.) regarding the potential child abduction incident 525. Since the severity of the child abduction incident 525 is very high, the electronic computing device may be programmed to assign a higher incident priority level to the incident 525. In this case, since the interaction measures 530, 535 of both talk group members 115-1, 115-2 are greater than the interaction threshold and the incident priority level of the incident 525 is also high, the electronic computing device adjusts the transmission preemption priorities of both the first and second talk group members 115-2, 115-3. The electronic computing device may determine the transmission preemption priority rankings to be adjusted for the first and second talk group members 115-1, 115-2 based on one or more of: respective user profiles of the first and second talk group members 115-1, 115-2 and the respective interaction measures determined for the first and second talk group members 115-1 and 115-2. The second talk group member 115-2 may be assigned a higher transmission preemption priority ranking than the first talk group member 115-1 when the interaction measure 535 corresponding to the second talk group member 115-2 is higher than the interaction measure 530 corresponding to the first talk group member 115-1. Alternatively, or additionally, the second talk group member 115-2 may be assigned a higher transmission preemption priority ranking than the first talk group member 115-1 when the user profile of the second talk group member 115-2 indicates, for example, a skill level or knowledge level that is more relevant to executing an incident task corresponding to the incident 525 than a skill level or knowledge level of the first talk group member 115-1. In this example, the electronic computing device accordingly assigns an adjusted transmission preemption priority ranking 540 of "2" to the first talk group member 115-1 and an adjusted transmission preemption priority ranking 545 of "1" to the second talk group member 115-2. The third talk group member 115-3 is also assigned an adjusted transmission preemption priority ranking 550 of "3" because the adjustment of the transmission preemption priority rankings assigned to the first and second talk group members 115-1, 115-2 also affects the transmission preemption priority ranking of "1" previously assigned to the third talk group member 115-3.

Further, as shown in FIG. 5, the third talk group member 115-3 continues to transmit to other talk group members 115-1 and 115-2 in the talk group 505. At this point, the first talk group member 115-1 signals a PTT input 560. In one embodiment, the PTT input 560 also includes the adjusted transmission preemption priority ranking 540 assigned to the first talk group member 115-1. Since the third talk group member 115-3 is already transmitting in the talk group 505 via the group call, the electronic computing device, in response to detecting the PTT input 560, compares the adjusted transmission preemption priority ranking 540 of "2" assigned to the first talk group member 115-2 with the adjusted transmission preemption priority ranking 550 of "3" assigned to the third talk group member 115-3. Since the adjusted transmission preemption priority ranking 540 of "2" assigned to the first talk group member 115-1 is greater than the adjusted transmission preemption priority ranking 555 of "3" assigned to the third talk group member 115-3, the electronic computing device allows the first communication device 110-1 associated with the first talk group member 115-1 to preempt the transmission from the third communication device 110-3 associated with the third talk group member 115-3. In one embodiment, as shown in FIG. 5, the electronic computing device releases 565 the floor granted to the third talk group member 115-3, thereby causing the third communication device 110-3 to stop transmitting to other talk group members 115-1, 115-2 in the talk group 505 during the group call. Concurrently, the electronic computing device grants a floor 570 to the first communication device 110-1 associated with the first talk group member 115-1 to enable the first communication device 110-1 to transmit (e.g., voice data) to other talk group members 115-2, 115-3 in the talk group 505 during the group call.

The electronic computing device continues to monitor an expiry timer assigned to the adjusted transmission preemption priority ranking 540 and an expiry timer assigned to the adjusted transmission preemption priority ranking 545. The adjusted transmission preemption priority rankings 540, 545 respectively expire 575, 580 upon the expiry of the respective expiry timers and this causes the electronic computing device to revert the respective transmission preemption priority rankings assigned to the first, second and third talk group members 115-1, 115-2, 115-3 to the previous transmission preemption priority rankings respectively assigned to the first, second and third talk group members 115-1, 115-2, 115-3. As shown in FIG. 5, in this example, the first talk group member 115-1 is assigned to the transmission preemption priority ranking of "3," the second talk group member 115-2 is assigned to the transmission preemption priority ranking of "2," and the third talk group member 115-3 is assigned to the transmission priority ranking of "1" after the expiry timers assigned to the respectively adjusted transmission preemption priority rankings 540, 545 expire 575, 580.

Figure 6A:
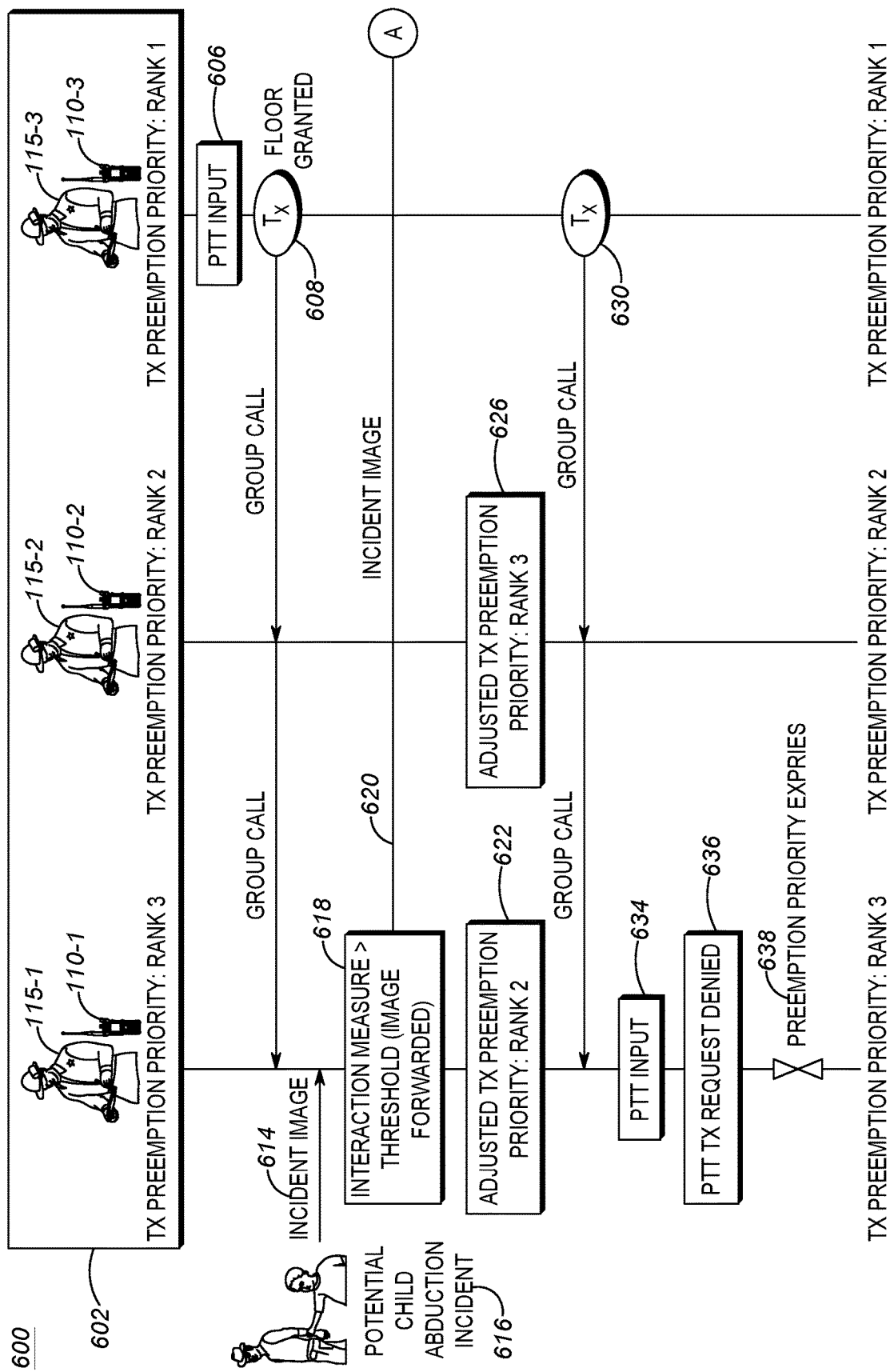
FIGS. 6A-6B illustrate a third example scenario in which the embodiments described herein can be advantageously implemented to preempt a transmission during a group call.
Figure 6B:
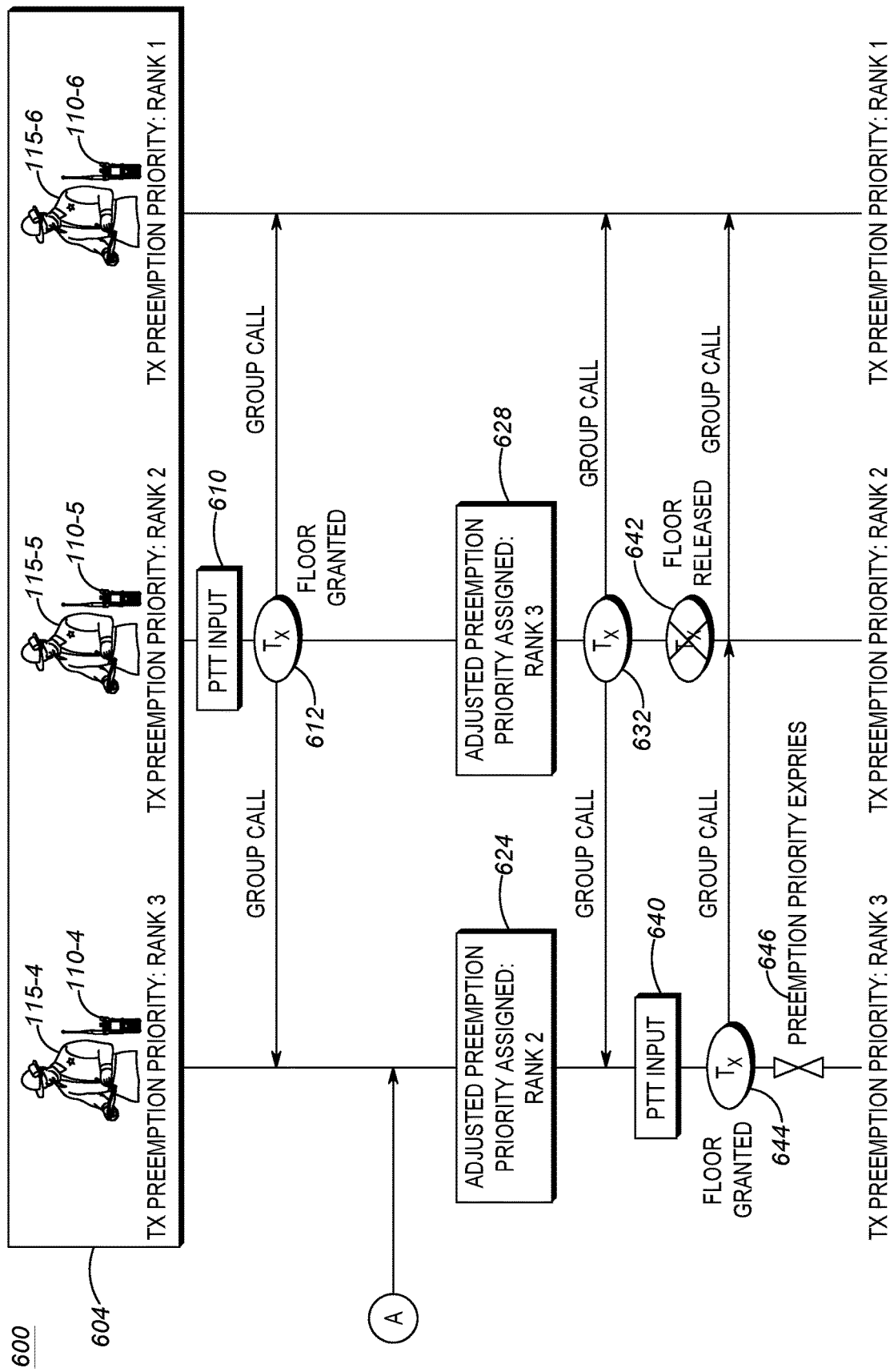

FIGS. 6A-6B illustrate an example scenario 600 in which the process 300 can be advantageously implemented to preempt a transmission during a group call. In the example scenario 600, a first talk group 602 is shown in FIG. 6A as including three talk group members including a first communication device 110-1 associated with a first talk group member 115-1, a second communication device 110-2 associated with a second talk group member 115-2, and a third communication device 110-3 associated with a third talk group member 115-3. Further, the first talk group member 115-1 is assigned a transmission (Tx) preemption priority ranking of "3," the second talk group member 115-2 is assigned a transmission (Tx) preemption priority ranking of "2," and the third talk group member 115-3 is assigned a transmission (Tx) preemption priority ranking of "1" within the first talk group 602. In FIG. 6B, a second talk group 604 is shown as including three talk group members i.e., a fourth communication device 110-4 associated with a fourth talk group member 115-4, a fifth communication device 110-5 associated with a fifth talk group member 115-5, and a sixth communication device 110-6 associated with a sixth talk group member 115-6. Further, in this example, the fourth talk group member 115-4 is assigned a transmission (Tx) preemption priority ranking of "3," the fifth talk group member 115-5 is assigned a transmission (Tx) preemption priority ranking of "2," and the sixth talk group member 115-6 is assigned to a transmission (Tx) preemption priority ranking of "1" within the second talk group 604.

A talk group member may initiate a request to establish a group call with members of the talk group by signaling a PTT input, for example, by pressing or clicking a PTT button implemented at the communication device 110 associated with the talk group member 115. As shown in FIG. 6A, the third talk group member 115-3 signals a PTT input 606. Since the third talk group member 115-3 has the highest transmission preemption priority ranking of "1" in the first talk group 602 and further no other talk group members are currently transmitting on the first talk group, the electronic computing device permits (e.g., by granting a floor) the third talk group member 115-3 to establish a group call and further transmit (e.g., voice data) 608 during the group call established for the first talk group 602. Similarly, in the second talk group 604 shown in FIG. 6B, the fifth talk group member 115-5 signals a PTT input 610. Since no other talk group members are currently transmitting in the second talk group 604, the electronic computing device 200 permits (e.g., by granting a floor) the fifth talk group member 115-5 to establish a group call and further transmit (e.g., voice data) 612 during the group call established for the second talk group 604.

As shown in FIG. 6A, the first talk group member 115-1 receives an incident image 614 (i.e., multimedia content) corresponding to a potential child abduction incident 616. A dispatcher may select the first talk group member 115-1 as the most relevant member for performing an incident task (e.g., to respond to the location at which the potential child abduction incident 616 was detected) in relation to the potential child abduction incident 616. For example, the dispatcher may send, via the dispatch console 160, an incident image 614 of an abductor abducting a child as captured by a surveillance camera system near the incident scene to the first talk group member 115-1.

In the example scenario 600 shown in FIG. 6A, the electronic computing device determines that an interaction measure 618 corresponding to a user interaction by the first talk group member 115-1 with the incident image 614 is greater than an interaction threshold. In this particular example, the interaction measure 618 is determined based on the first talk group member 115-1 forwarding 620 the incident image 614 received from the dispatch console 160 to another talk group member i.e., fourth talk group member 115-4 associated with the second talk group 604. In accordance with embodiments, the electronic computing device initiates a procedure to adjust the transmission preemption priority ranking assigned to a talk group member forwarding the incident image and similarly initiates a separate procedure to adjust the transmission preemption priority assigned to a talk group member to whom the incident image 614 is forwarded. In one embodiment, as shown in FIGS. 6A-6B, when another talk group member receives a forwarded multimedia content, the electronic computing device may proceed to adjust the transmission preemption priority assigned to the other talk group member whether or not the other talk group member interacts with the multimedia content. Accordingly, in this example, the electronic computing device automatically determines an adjusted transmission preemption priority ranking 622 of "2" for the first talk group member 115-1 in the first talk group 602 and an adjusted transmission preemption priority ranking 624 of "2" for the fourth talk group member 115-4 (to whom the incident image 614 is forwarded) in the second talk group 604. The second talk group member 115-2 in the first talk group 602 is also assigned an adjusted transmission preemption priority ranking 626 of "3" because the adjustment of the transmission preemption priority assigned to the first talk group member 115-1 also affects the transmission preemption priority ranking of "2" previously assigned to the second talk group member 115-2. Similarly, the fifth talk group member 115-5 in the second talk group 604 is also assigned an adjusted transmission preemption priority ranking 628 of "3" because the adjustment of the transmission preemption priority assigned to the fourth talk group member 115-4 also affects the transmission preemption priority ranking of "2" previously assigned to the fifth talk group member 115-5.

Further, as shown in FIG. 6A, the third talk group member 115-3 in the first talk group 602 continues to transmit 630 to other talk group members in the first talk group 602. At this point, the first talk group member 115-1 signals a PTT input 634. In one embodiment, the PTT input 634 also includes the adjusted transmission preemption priority ranking 622 assigned to the first talk group member 115-1. Since the third talk group member 115-3 is already transmitting in the first talk group 602 via the group call, the electronic computing device, in response to detecting the PTT input 634, compares the adjusted transmission preemption priority ranking 622 of "2" assigned to the first talk group member 115-1 with the transmission preemption priority ranking of "1" assigned to the third talk group member 115-3. Since the adjusted transmission preemption priority ranking 622 of "2" assigned to the first talk group member 115-1 is lower than the transmission preemption priority ranking of "1" assigned to the third talk group member 115-3, the electronic computing device may provide an indicator 636 at the first communication device 110-1 associated with the first talk group member 115-1 indicating that the PTT request to transmit during the group call in the first talk group 602 is denied for the first talk group member 115-1. In other words, in this example, the electronic computing device does not preempt the transmission from the third talk group member 115-3 because the adjusted transmission preemption priority ranking 622 assigned to the first talk group member 115-1 is still lower than the transmission preemption priority ranking assigned to the third talk group member 115-3. Accordingly, the first talk group member 115-1 has to wait to transmit until the third talk group member 115-3 completes its transmission on the group call in the first talk group 602. Further, the electronic computing device continues to monitor an expiry timer assigned to the transmission preemption priority ranking 622 assigned to the first talk group member 115-1. When the expiry timer assigned to the transmission preemption priority ranking 622 expires 638, the electronic computing device reverts the transmission preemption priority rankings for the first and second talk group members 115-1, 115-2 to the previously assigned transmission preemption priority rankings.

Further, as shown in FIG. 6B, the fifth talk group member 115-5 in the second talk group 604 continues to transmit 632 to other talk group members in the second talk group 604. At this point, the fourth talk group member 115-4 signals a PTT input 640. In response to the PTT input 640, the electronic computing device compares the adjusted transmission preemption priority ranking 624 of "2" assigned to the fourth talk group member 115-4 with the adjusted transmission preemption priority ranking 628 of "3" assigned to the fifth talk group member 115-5. Since the adjusted transmission preemption priority ranking 624 of "2" assigned to the fourth talk group member 115-4 is greater than the adjusted transmission preemption priority ranking 628 of "3" assigned to the fifth talk group member 115-5, the electronic computing device allows the fourth communication device 110-4 associated with the fourth talk group member 115-4 to preempt the transmission from the fifth communication device 110-5 associated with the fifth talk group member 115-5. In one embodiment, as shown in FIG. 6B, the electronic computing device releases 642 the floor granted to the fifth talk group member 115-5, thereby causing the fifth communication device 110-5 to stop transmitting to other talk group members 115-4, 115-6 in the second talk group 604 during the group call. Concurrently, the electronic computing device grants a floor 644 to the fourth communication device 110-4 associated with the fourth talk group member 114-1 to enable the fourth communication device 110-4 to transmit (e.g., voice data) to other talk group members 115-5, 115-6 in the second talk group 604 during the group call.

The electronic computing device continues to monitor an expiry timer assigned to the adjusted transmission preemption priority ranking 624. The adjusted transmission preemption priority ranking 624 expires 646 upon the expiry of the expiry timer. The expiry 646 of the adjusted transmission preemption priority ranking 624 causes the electronic computing device to revert the respective transmission preemption priority rankings assigned to the fourth and fifth talk group members 115-4, 115-5 to the previous transmission preemption priority rankings respectively assigned to the fourth and fifth talk group members 115-4, 115-5. As shown in FIG. 6B, in this example, the fourth talk group member 115-4 is assigned the transmission preemption priority ranking of "3" and the fifth talk group member 115-5 is assigned the transmission preemption priority ranking of "2" after the expiry timer assigned to the adjusted transmission preemption priority ranking 624 expires 646.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for preempting a transmission during a group call, the method comprising:
    detecting, at an electronic computing device, a user interaction by a first talk group member with multimedia content corresponding to an incident;
    determining, at the electronic computing device, an interaction measure corresponding to the user interaction with the multimedia content;
    determining, at the electronic computing device, an incident priority level associated with the incident;
    adjusting, at the electronic computing device, a transmission preemption priority assigned to the first talk group member based on the interaction measure and the incident priority level; and
    detecting, at the electronic computing device, a user input to initiate a transmission from a first communication device associated with the first talk group member during a group call, and responsively preempting a transmission from a second communication device associated with a second talk group member participating in the group call when the adjusted transmission preemption priority assigned to the first talk group member is greater than a transmission preemption priority assigned to the second talk group member.

2. The method of claim 1, further comprising:
    determining a duration of time needed to execute an incident task by the first talk group member in relation to the incident; and
    assigning an expiry timer for the adjusted transmission preemption priority as a function of the duration of time.

3. The method of claim 2, further comprising
    prior to preempting the transmission from the second communication device, determining whether the expiry timer assigned to the transmission preemption priority has expired; and
    preempting the transmission from the second communication device when the expiry timer assigned to the transmission preemption priority has not expired and when the adjusted transmission preemption priority assigned to the first talk group member is greater than the transmission preemption priority assigned to the second talk group member.

4. The method of claim 1, further comprising:
    prior to adjusting the transmission preemption priority for the first communication device, determining whether the interaction measure is greater than an interaction measure threshold and whether the incident priority level is greater than a predefined priority level; and
    adjusting the transmission preemption priority when the interaction measure is greater than the interaction measure threshold and when the incident priority level is greater than the predefined priority level.

5. The method of claim 1, wherein the interaction measure is assigned as a function of a type of the user interaction with the multimedia content, and duration of the user interaction with the multimedia content.

6. The method of claim 5, wherein the type of user interaction includes one or more of: playing the multimedia content, emphasizing or paying attention to a certain specific portion of the multimedia content, forwarding the multimedia content to another user, annotating the multimedia content, and initiating a search query related to a feature of the multimedia content.

7. The method of claim 1, further comprising:
determining the incident priority level based on one or more of: incident identifier, incident severity, incident type, incident location, time elapsed since the incident has been reported, and number of mobilized assets assigned to respond to the incident.

8. The method of claim 1, further comprising:
transmitting a message including the adjusted transmission preemption priority to the first communication device.

9. The method of claim 1, further comprising:
determining an update in the incident priority level; and
readjusting the transmission preemption priority based on the update in incident priority level, wherein the readjusted transmission preemption priority is lower than the adjusted transmission preemption priority when the updated incident priority level is lower than the incident priority level, and further wherein the readjusted transmission preemption priority is greater than the adjusted transmission preemption priority when the updated incident priority level is greater than the incident priority level.

10. The method of claim 1, further comprising:
detecting at least one other user interaction by a third talk group member with the multimedia content;
assigning at least one other interaction measure corresponding to the at least one other user interaction with the multimedia content; and
adjusting the transmission preemption priority assigned to a third talk group member based on the at least one other interaction measure and the incident priority level,
wherein the adjusted transmission preemption priority assigned to the third talk group member is lower than the adjusted transmission preemption priority assigned to the first talk group member when the at least one other interaction measure is lower than the interaction measure, and wherein the adjusted transmission preemption priority assigned to the third talk group member is greater than the adjusted transmission preemption priority assigned to the first talk group member when the at least one other interaction measure is greater than the interaction measure.

11. The method of claim 1, wherein when the user interaction corresponds to forwarding the multimedia content to a third communication device associated with a third talk group member, the method further comprising:
adjusting a transmission preemption priority assigned to the third group talk member based on the incident priority level with which the forwarded multimedia content is associated; and
transmitting a message indicating the adjusted transmission preemption to the third communication device.

12. The method of claim 11, wherein when the third communication device and the first communication device are participating in the same group call, and further when the adjusted transmission preemption priority for the third communication device is same as the first communication device, the method further comprising:
readjusting the adjusted transmission preemption priority of the first communication device based on a user profile associated with the first talk group member; or readjusting the adjusted transmission preemption priority of the third communication device based on a user profile associated with the third talk group member.

13. The method of claim 1, wherein preempting the transmission from the second communication device comprises:
transmitting a first message to the second communication device indicating that a floor granted to the second communication device to transmit during the group call is being released; and
transmitting a second message to the first communication device indicating that a floor is granted to the first communication device to transmit during the group call.

14. An electronic computing device, comprising
a communication interface; and
an electronic processor communicatively coupled to the communication interface, wherein the electronic processor is configured to:
detect a user interaction by a first talk group member with multimedia content corresponding to an incident;
determine an interaction measure corresponding to the user interaction with the multimedia content;
determine an incident priority level associated with the incident;
adjust a transmission preemption priority assigned to the first talk group member based on the interaction measure and the incident priority level; and
detect a user input to initiate a transmission from a first communication device associated with the first talk group member during a group call, and responsively preempt a transmission from a second communication device associated with a second talk group member participating in the group call when the adjusted transmission preemption priority assigned to the first talk group member is greater than a transmission preemption priority assigned to the second talk group member.

15. The electronic computing device of claim 14, wherein the electronic processor is configured to:
determine a duration of time needed to execute an incident task by the first talk group member in relation to the incident; and
assign an expiry timer for the adjusted transmission preemption priority as a function of the duration of time.

16. The electronic computing device of claim 15, wherein the electronic computing device is configured to:
determine, prior to preempting the transmission from the second communication device, whether the expiry timer assigned to the transmission preemption priority has expired; and
preempt the transmission from the second communication device when the expiry timer assigned to the transmission preemption priority has not expired and when the adjusted transmission preemption priority assigned to the first talk group member is greater than the transmission preemption priority assigned to the second talk group member.

17. The electronic computing device of claim 14, wherein the electronic computing device is configured to:
determine, prior to adjusting the transmission preemption priority for the first communication device, whether the interaction measure is greater than an interaction measure threshold and whether the incident priority level is greater than a predefined priority level; and adjust the transmission preemption priority when the interaction measure is greater than the interaction measure threshold and when the incident priority level is greater than the predefined priority level.

18. The electronic computing device of claim 14, wherein the interaction measure is assigned as a function of a type of the user interaction with the multimedia content, and duration of the user interaction with the multimedia content.

19. The electronic computing device of claim 14, wherein the electronic computing device is configured to:
  determine that the user interaction corresponds to forwarding the multimedia content from the first communication device to a third communication device associated with a third talk group member;
  adjust a transmission preemption priority assigned to the third talk group member based on the incident priority level of the incident with which the forwarded multimedia content is associated; and
  transmit, via the communication interface, a message indicating the adjusted transmission preemption to the third communication device.

20. The electronic computing device of claim 14, wherein the electronic computing device is configured to:
  preempt the transmission from the second communication device by:
    transmitting, via the communication interface, a first message to the second communication device indicating that a floor granted to the second communication device to transmit during the group call is being released; and
    transmitting, via the communication interface, a second message to the first communication device indicating that a floor is granted to the first communication device to transmit during the group call.

* * * * *